United States Patent
Crescenzi et al.

(10) Patent No.: US 9,104,043 B2
(45) Date of Patent: Aug. 11, 2015

(54) DETACHABLE LENSES FOR EYEWEAR

(71) Applicant: Switch Vision LLC, Fairfield, NJ (US)

(72) Inventors: Deni Crescenzi, Toronto (CA); Carmine S. DiChiara, Warren, NJ (US)

(73) Assignee: Switch Vision LLC, Fairfield, NJ (US)

( * ) Notice: Subject to any disclaimer, the term of this patent is extended or adjusted under 35 U.S.C. 154(b) by 89 days.

(21) Appl. No.: 13/792,494

(22) Filed: Mar. 11, 2013

(65) Prior Publication Data

US 2013/0235325 A1    Sep. 12, 2013

Related U.S. Application Data

(60) Provisional application No. 61/608,967, filed on Mar. 9, 2012.

(51) Int. Cl.
  *G02C 1/00*    (2006.01)
  *G02C 1/06*    (2006.01)
  *G02C 7/02*    (2006.01)

(52) U.S. Cl.
  CPC .. *G02C 1/10* (2013.01); *G02C 1/06* (2013.01); *G02C 7/02* (2013.01); *G02C 2200/02* (2013.01)

(58) Field of Classification Search
  CPC ............ G02C 1/06; G02C 1/10; G02C 5/008; G02C 7/02; G02C 11/02; G02C 2200/02; G02C 2200/08
  USPC .................................. 351/83, 86, 51, 52, 154
  See application file for complete search history.

(56) References Cited

U.S. PATENT DOCUMENTS

| | | |
|---|---|---|
| 4,596,329 A | 6/1986 | Eldridge, Jr. |
| 5,801,806 A | 9/1998 | DiChiara |
| 6,270,216 B1 | 8/2001 | DiChiara |
| 6,726,004 B2 | 4/2004 | Watson |
| 6,890,073 B2 | 5/2005 | DiChiara et al. |
| 7,137,700 B2 | 11/2006 | DiChiara et al. |
| D550,756 S | 9/2007 | Li et al. |
| D568,924 S | 5/2008 | Markovitz |
| D570,899 S | 6/2008 | Lee |
| 7,380,655 B1 | 6/2008 | Thune et al. |
| 7,543,930 B2 | 6/2009 | DiChiara |
| 7,665,625 B1 | 2/2010 | Rothstein et al. |
| D621,438 S | 8/2010 | Markovitz et al. |
| 7,850,301 B2 | 12/2010 | DiChiara |
| D645,074 S | 9/2011 | Markovitz et al. |
| D645,076 S | 9/2011 | Markovitz et al. |
| D646,316 S | 10/2011 | Zhao |
| D647,950 S | 11/2011 | Markovitz et al. |

(Continued)

*Primary Examiner* — Huy K Mai
(74) *Attorney, Agent, or Firm* — Lerner, David, Littenberg, Krumholz & Mentlik, LLP

(57) ABSTRACT

Modular eyewear includes a frame and lens assemblies insertable into and removable from the frame which has a rim located between a bridge and each of two temples. Each rim includes a front face, a groove adjacent to the bridge, and an indentation adjacent to the temple. Attached along each of the groove and the indentation are frame magnets. The lens assemblies include a lens having a perimeter surrounding a body with front and rear surfaces. A tab is applied to and extends from the front surface of each lens at the perimeter. Magnetic couplings are attached along a first portion of the perimeter behind the tab and along a second portion of the perimeter, respectively. When the eyewear is assembled, the frame magnets magnetically attach to the corresponding magnetic couplings, and the tab is inserted into the indentation to fill the indentation flush with the frame front face.

14 Claims, 3 Drawing Sheets

(56) References Cited

U.S. PATENT DOCUMENTS

| | | |
|---|---|---|
| D651,640 S | 1/2012 | Sheldon |
| 8,092,007 B2 | 1/2012 | Dichiara |
| 8,123,351 B2 | 2/2012 | Moritz et al. |
| D658,701 S | 5/2012 | Iinuma et al. |
| 8,182,086 B2 | 5/2012 | Cheong |
| D709,549 S | 7/2014 | Sheldon |
| D709,943 S | 7/2014 | Du |
| 2003/0173234 A1 | 9/2003 | Lin |
| 2004/0183994 A1 | 9/2004 | DiChiara et al. |
| 2005/0280771 A1 | 12/2005 | DiChiara et al. |
| 2006/0242745 A1 | 11/2006 | DiChiara |
| 2008/0304005 A1 | 12/2008 | DiChiara |
| 2009/0051866 A1 | 2/2009 | DiChiara |
| 2009/0257019 A1* | 10/2009 | DiChiara .................... 351/106 |
| 2009/0296042 A1* | 12/2009 | Yeh .............................. 351/86 |
| 2010/0064422 A1 | 3/2010 | DiChiara |
| 2011/0007263 A1 | 1/2011 | DiChiara |
| 2012/0005811 A1 | 1/2012 | McCrory et al. |
| 2012/0019770 A1 | 1/2012 | DiChiara |

\* cited by examiner

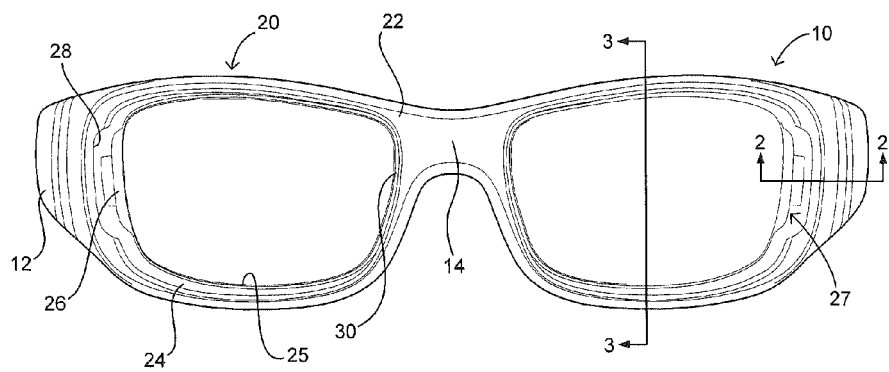
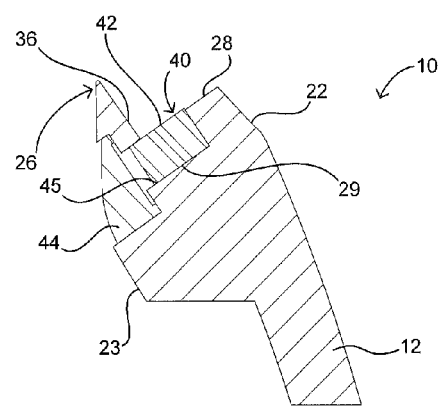
SECTION 2-2
FIG. 2

SECTION 3-3

SECTION 5-5

DETACHABLE LENSES FOR EYEWEAR

CROSS-REFERENCE TO RELATED APPLICATION

The present application claims the benefit of the filing date of U.S. Provisional Patent Application No. 61/608,967 filed Mar. 9, 2012, the disclosure of which is hereby incorporated herein by reference.

BACKGROUND OF THE TECHNOLOGY

A typical pair of eyeglasses includes a pair of lenses or a single shield mounted to a frame that may include rims around the lenses; a brow bar; a bridge piece connecting the inner ends of the rims; and two temple pieces attached to the outer ends of the rims for resting the glasses on the user. Lenses are typically mounted to the eyeglass frame by a screw or other fastening device that tightens the rim around the lens. In the conventional configuration, the screw must be removed before the lens may be removed. The screw is often small and identifying the size and type of screw can require the user to strain his or her eyes. Removing the screw requires that the user have a screw driver or other tool that fits the particular screw in that pair of eyewear. Users will often not have the proper screwdriver. If the screw is broken or stripped, the user must then find a suitable replacement screw. This is inconvenient for the user as different eyeglasses use different kinds of screws which may have different head types and sizes. These different screws will often not work in different pairs of eyeglasses or with different screwdrivers. Additionally, if the screw breaks while in the glasses, the user may have difficulty removing the broken screw. Users may also desire to change lenses while wearing the glasses to accommodate different lighting conditions. Mounting lenses to the frame using screws can make this process highly inconvenient for the user.

Recently, prescription lenses have been developed with notches to make them interchangeable in brow bar designs if desired. This requires a forcing of the brow bar to go over the notches in the lenses. This technique can be quite cumbersome to work with in both the insertion and removal of the lenses.

More recently, to overcome these lens removal challenges, eyewear having magnetic coupling systems for eyeglass lenses has been developed. Eyewear having this configuration may have magnets attached on an inner portion of a rim that are releasably coupled to attracting magnets on the edges of lenses. The lenses having such magnets may be inserted into frames having various rim configurations such as winged rims on "blade"-style frames or full rims that can completely enclose the lenses. Due to the releasable magnetic coupling system, the lenses are easily removable, providing for rapid interchangeability of lenses having corresponding magnets into frames having magnets adapted to magnetically attach to the lenses. In this manner, lenses of different shades and colors and designs may be used with one or multiple frames.

Full rim configurations have conventionally included a stepped interior surface providing a mechanical stop for the lens when inserted. This requires the lens to be inserted from either the front or the back, as opposed to being slid into the frame from the side as in blade-style frames. The lenses for use in the full rim configurations have magnets around their perimeters, which due to the transparency of the lenses, may be visible upon insertion into the frames in these configurations.

It may be desirable to provide other implementations of full rim eyeglasses for magnetic coupling systems.

BRIEF SUMMARY OF THE TECHNOLOGY

In accordance with one aspect of the technology, a frame for a pair of individualized eyeglass lenses may have two temples for resting the frame on a user's ears, a bridge for resting the frame on a user's nose, and a rim located between the bridge and each of the two temples for receiving first and second lenses of the pair of eyeglass lenses therein. At least one of the rims may include a front face and an inner portion circumscribing the rim. In some arrangements, the inner portion of the rim may have a first portion at least partially adjacent to the bridge. The first portion of the inner portion may include a ledge for supporting a bridge side of the first lens. In some arrangements, the inner portion of the rim may have a second portion adjacent to the temple. Optionally, the second portion of the inner portion may have an indentation. Such an indentation may be dimensioned such that when the first lens is received in the rim, a lens tab applied to and extending from the first lens may be inserted into the indentation to fill a portion thereof. In some arrangements, the second portion may have a lip on a bottom thereof for supporting a temple side opposite the bridge side of the first lens. In some configurations, the lip may be set at a depth from the front face such that when the first lens is received in the rim, a top surface of the lens tab is flush with the front face. The rim may include a mating element exposed within the second portion of the rim for detachably attaching to a coupling element of the first lens which may be attached to the lens under the lens tab.

In some arrangements, the second portion of the inner portion of the rim may include a groove adjacent to the bridge. In this manner, when a lens is received in the rim, a portion of the lens may be inserted into the groove. Optionally, the rim may include two mating elements adapted for bonding to two coupling elements of the first lens. In some such arrangements, one of the mating elements may be along the second portion and the other of the mating elements may be in the groove. Optionally, at least one coupling element of the first lens may be a magnet. In such configurations, a corresponding mating element of the frame may be a corresponding magnet for bonding to the magnet of the first lens. In some arrangements, each of the rims may be a full rim, while in other arrangements one or both of the rims may be a partial rim having an opening through a portion of a side of the rim.

In accordance with another aspect of the technology, a lens assembly for eyeglasses may include a lens having a body with front and rear surfaces as well as a perimeter about the front and rear surface of the lens. The lens may be adapted for insertion into a frame having a front face and at least one mating element attached within an indentation formed on an inner portion of a rim of the frame in which the inner portion circumscribes the rim. In some arrangements, a tab may be applied to and extend from the front surface of the lens at the perimeter of the lens. In some configurations, the tab may be dimensioned such that upon insertion of the lens into the frame, the tab may fill a portion of the indentation of the frame rim. Optionally, the tab may be further dimensioned such that upon insertion of the lens into the frame, the tab is flush with the front face. In some configurations, the tab may include an ornamental portion corresponding to a missing ornamental portion of the frame. Optionally, the tab may form a monolithic structure with the lens such that the tab and the lens are not separable.

A first coupling element may be attached along a first portion of the perimeter of the lens. Optionally, the first coupling element may be attached behind the tab for detachably attaching to a first mating element attached to the rim. In some such configurations, a portion of the rear surface of the lens may be directly below the tab. The portion of the rear surface directly below the tab may be adapted to rest on a lip along the inner portion of the rim. Optionally, a second coupling element may be attached along a second portion of the perimeter of the lens for detachably attaching to a second mating element attached to the rim. In some such configurations, the indentation in the rim may be on a temple side of the rim and the second mating element may be attached to a groove in the inner portion on a bridge side of the rim opposite the temple side. In some configurations, each of the first and second coupling elements may be magnets and each of the first and second mating elements may be magnetic such that the first and second coupling elements are attracted to the first and second mating elements, respectively.

In accordance with yet another aspect of the technology, there is provided modular eyewear. Such eyewear may include a frame having two temples for resting the frame on a user's ears, a bridge for resting the frame on a user's nose, and a rim located between the bridge and each of the two temples. Each of the rims may include a front face, an inner portion circumscribing the rim and having a groove adjacent to the bridge. The groove may have a first frame magnet attached along a portion of the groove. In some arrangements, the groove may include an indentation adjacent the corresponding temple of the frame. In some arrangements, the indentation may include a second frame magnet attached along a portion of the indentation. The eyewear may further include removable lens assemblies insertable into each of the rims of the frame. Each of the lens assemblies may include a lens having a body with front and rear surfaces and a perimeter about the lens. Optionally, a tab may be applied to and extend from the front surface of the lens at the perimeter. In some arrangements, a first magnetic coupling may be attached along a first portion of the perimeter. In some arrangements, a second magnetic coupling may be attached along a second portion of the perimeter. In this manner, when the lens assemblies are inserted into the frame, in some arrangements, the first frame magnet may be magnetically attached to the first magnetic coupling, while, in some arrangements, the second frame magnet may be magnetically attached to the second magnetic coupling. In some configurations that include a tab, the tab of the lens assembly may be inserted into the indentation to fill a portion of the indentation flush with the front face of the frame. In some arrangements, each of the rims may be a full rim, while in other arrangements one or both of the rims may be a partial rim having an opening through a portion of a side of the rim.

In some alternative arrangements, the indentation of each of the rims of the frame may further include a lip on a bottom of the indentation for supporting a temple side opposite a bridge side of each of the lens assemblies. In some such configurations, the lip may be set at a depth from the front face such that a top surface of the tab of the lens assemblies is flush with the front face upon insertion of the lens assemblies into the frame.

In accordance with yet another aspect of the technology, a frame for a pair of individualized eyeglass lenses may have two temples for resting the frame on a user's ears, a bridge for resting the frame on a user's nose, and a rim located between the bridge and each of the two temples for receiving first and second lenses of the pair of eyeglass lenses within the respective rim. At least one of the rims may include a front face and a ledge circumscribing an inner portion of the rim adjacent to the front face. The ledge may include at least a first portion at least partially adjacent to the bridge for supporting a bridge side of the first lens and a second portion adjacent to the temple for supporting a temple side opposite the bridge side of the first lens. In such an arrangement, the rim may include at least one mating element exposed at the second portion for detachably attaching to at least one coupling element of the first lens attached to a temple side of the lens.

In accordance with yet another aspect of the technology, there is provided a lens assembly for insertion into a frame for eyeglasses. The frame for such an assembly may have a front face. In some arrangements, the frame may include first mating element exposed at and attached to a bridge side of an inner portion of a rim of the frame. In some arrangements, the frame may include a second mating element exposed at and attached to a temple side of the inner portion of the rim in which, in some arrangements, the inner portion may include a ledge. A lens of the lens assembly may have a body with front and rear surfaces and a perimeter thereabout. In some arrangements, the lens may be adapted for insertion into the frame such that the lens rests against the ledge of the rim. The lens assembly may include either or both of first and second coupling elements. Such a first coupling element may be optionally attached along a first portion of the perimeter of the lens for detachably attaching to the first mating element attached to the rim. Such a second coupling element optionally may be attached along a second portion of the perimeter of the lens, the second coupling element for detachably attaching to the second mating element attached to the rim.

BRIEF DESCRIPTION OF THE DRAWINGS

FIG. 1 is a front view of a frame for eyeglasses in accordance with an embodiment of the present technology.

FIG. 2 is a cross-sectional view of the section 2-2 of FIG. 1.

DETAILED DESCRIPTION

Figure 3:
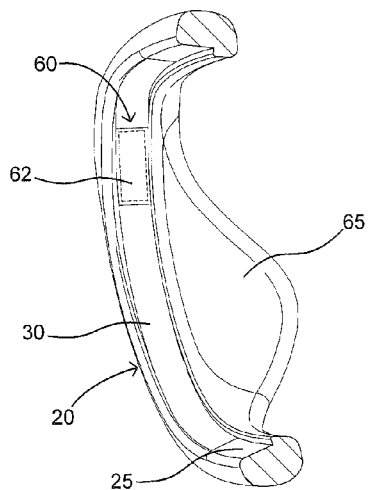
FIG. 3 is a cross-sectional cutaway view of the section 3-3 of FIG. 1.

In the Brief Summary of the Technology above, the Detailed Description of the Technology herein, the claims below, and in the accompanying drawings, reference is made to particular features of the technology. It is to be understood that the disclosure of the technology in this specification includes all possible combinations of such particular features. For example, where a particular feature is disclosed in the context of a particular aspect, arrangement, or embodiment of the technology, or a particular claim, that feature can also be used, to the extent possible, in combination with and/or in the context of other particular aspects, arrangements, and embodiments of the technology, and in the technology generally. Furthermore, although the FIGS. 1-6 described further herein depict an example of an embodiment of the present technology, it is to be understood that the technology encompasses further embodiments that are not shown in the figures.

As used herein, the terms "back" and "proximal" may be considered synonymous and may be understood to describe a location nearest a user of the embodiments of the technology described herein in contrast to the terms "front" and "distal" which may be considered synonymous and may be understood to describe a location furthest from a user and opposite a location described by the terms "back" and "proximal." As further used herein, features discussed with respect to one side of the eyewear described herein are also features of the other side unless stated to the contrary. However, it is to be noted that features on opposite sides of the eyewear are inverse configuration, i.e., "mirror images," of each other.

Referring now to FIG. 1, in some embodiments of the present technology, a frame 10 for use in modular eyewear may include two temples 12 each extending in the same direction from a temple end and a bridge 14 extending from a bridge end of each of two respective rims 20. Each of the rims 20 shown in the example of FIG. 1 are "full" rims completely surrounding an annulus therethrough. Each of the rims 20 has a front face 22 on a distal portion of the rims 20, the distal portion being on a side opposite the direction to which the temples 12 extend from the rims 20. The rims may further have an inner portion 25 circumscribing the annulus through the rims 20.

As further shown in FIG. 1, a ledge 24 may traverse upper and lower portions of the inner portion 25. The ledge 24 may be a smooth surface located closer to a rear face 23 (partially shown in FIG. 2) on a proximal portion of the rims 20 located on the side of the frame 10 from which the temples 12 extend, to allow for a lens to rest thereon as discussed further herein. In the example of FIG. 1, the bridge end of each of the rims 20 may include a groove 30 described in greater detail herein. The temple end of each of the rims 20 may include an indentation 27 formed by a lip 26 and a sidewall 28. As shown, the lip 26 may include a surface 36, which may be smooth, on a distal portion of the lip 26 that extends substantially from the temple end towards the bridge end of each of the rims 20. The surface 36 of the lip 26 may be set at a predetermined depth from the front face 22 to accommodate a predetermined thickness of a lens as further described herein. The indentation may also be considered a missing portion of an ornamental design of the frame.

Referring to both FIGS. 1 and 2, the sidewall 28 may extend from a portion of the surface 36 of the lip 26 nearest the temple 12 to the front face 22. Due to the depth of the surface 36, a perimeter of a lens may be placed adjacent the sidewall 28 such that it rests at or below the portion of the rim 20 at which the sidewall 28 meets the front face 22. As further shown in FIGS. 1 and 2, a first mating element 40 may be inserted into a portion of the sidewall 28 against an inset surface 29. The first mating element 40 may be adapted for a detachable interface with a lens adapted for such an interface. In various embodiments, the first mating element 40 may be a magnet or other object attracted to magnets. As further shown in these figures, the first mating element 40 may have the shape of what can be described as an extruded trapezoid in which the mating element 40 has an exposed face 42 which is rectangular and that faces towards the bridge 14 on an end of the first mating element 40 protruding out of the sidewall 28. Such an extruded trapezoid may further have first and second trapezoidal faces that each extend from the exposed face 42 towards the inset surface 29. In this arrangement, a portion of the first mating element 40 attached on an end of the trapezoidal faces opposite the exposed face 42 may be larger than the portion of the sidewall 28 through which the exposed face 42 protrudes such that the first mating element 40 may not slide or be pulled out of the sidewall 28.

As further shown in FIG. 2, a hole 45 may be provided through the rear face 23 of the frame 20 to enable insertion of the first mating element 40 into the rim 20. Once the first mating element 40 is inserted into the rim 20, a cover 44 may be placed over the hole 45.

As illustrated in FIG. 3, the groove 30 may run along the inner portion 25 on the bridge end of the rim 20. The groove 30 may have a width that is substantially the thickness of a lens for insertion therein. Along a portion of the groove 30 may be a second mating element 60. Like the first mating element 40, the second mating element 60 may be a magnet and may further have the shape of an extruded trapezoid. As in the example shown in FIG. 3, the mating element 60 may protrude slightly through a cavity within the groove 30 in a manner similar to the protrusion of the first mating element 40 through the sidewall 28. The second mating element 60 may have an exposed face 62 which is rectangular and which is on an end of the second mating element 60 that protrudes out of the groove 30 to allow for a detachable interface with a lens adapted for such an interface. The exposed face 62 may face towards the temple 12 and have first and second trapezoidal faces that each extend from the exposed face 62 inwardly towards a nosepiece 65 attached to the bridge 14 on the proximal portion of the frame 10.

Figure 4:
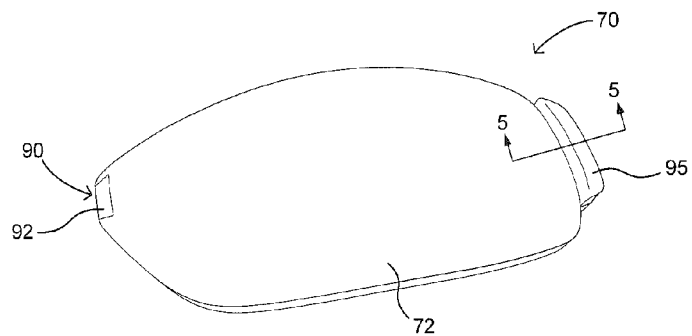
FIG. 4 is a perspective view of a lens in accordance with an embodiment of the present technology.
Figure 5:
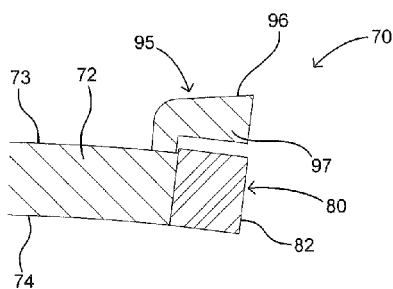
FIG. 5 is a cross-sectional view of the section 5-5 of FIG. 4.

Shown in FIGS. 4 and 5 is a lens (or lens assembly) 70 for use in modular eyewear that may be inserted into and easily detachable from a rim of a frame such as the rim 20 of the frame 10 just described. As shown in this figure, in some embodiments, the lens 70 may have one or optionally, additional coupling elements. In the example shown, in some arrangements, the lens 70 may have a first coupling element 80 on a temple end of a body 72. As further shown in the example, the lens 70 may include a second coupling element 90 on a bridge side of the body 72. It should be noted, as shown in FIG. 5, that the lens body 72 may have a front face 73 on one side and a rear face 74 on an opposite side. Each of the coupling elements 80, 90 may have an extruded trapezoidal shape in a similar manner to the first and second mating elements 40, 60 described previously herein. Such a configuration prevents the coupling elements 80, 90 from being pulled or sliding out of the lens body 72 to which they are attached. Additionally, an adhesive, such as an epoxy, may be applied at the interfaces of the coupling elements 80, 90 and the lens body 72 to secure the coupling elements 80, 90 within each respective end of the lens body 72.

As seen in FIG. 4, optionally, a tab 95 may be arranged as a component of the lens, such as an applied element at the temple end of the lens body 72. The tab may serve as a cover to conceal a coupling element (e.g., magnet) that is also a component of the lens. Similarly, the tab may serve as a prying mechanism for removing the lens. The tab may also have a structure that corresponds to the structure of the indentation of the frame so as to serve as the missing portion of the ornamental design of the frame previously described. For example, referring now to FIG. 5, when the first coupling element 80 is inserted into the temple end of the lens body 72, the tab 95 may be placed over the first coupling element 80 and a portion of the lens body 72 such that the first coupling element 80 is not visible when looking towards the front face 73 of the lens body 72. The tab 95 may be secured to the lens body 72 through the use of pins (not shown) that are pressed into the tab 95 through the rear face 74 of the lens body 72. In this manner, the pins can be inserted without being visible when looking towards the front face 73 of the lens body 72. Alternatively, the tab may be secured to the lens body by other securing mechanisms including, but not limited to, other fasteners, such as screws, or an adhesive, such as epoxy applied between the tab and the lens body. As further shown in FIG. 5, the tab 95 may have a ridge 97 extending over an edge of the first coupling element 80. The ridge 97 may be dimensioned to allow for a fingernail to be placed under the ridge and serve as the prying mechanism for removing the lens.

Each of the coupling elements 80, 90 may be magnets or formed of magnetic material. Accordingly, the first coupling element 80 may have a contact face 82 and the second coupling element 90 may have a contact face 92 for magnetically coupling to corresponding mating elements on the frame. Furthermore, each of the contact faces 82, 92 may be exposed on their respective temple and bridge ends of the lens 70 to enable a mechanical interface between the corresponding mating and coupling elements, such as previously described herein. Furthermore, the contact faces 82, 92 may be rectangular and may further have substantially the same contact area as the respective exposed faces of the corresponding mating elements with which they may interface.

Figure 6:
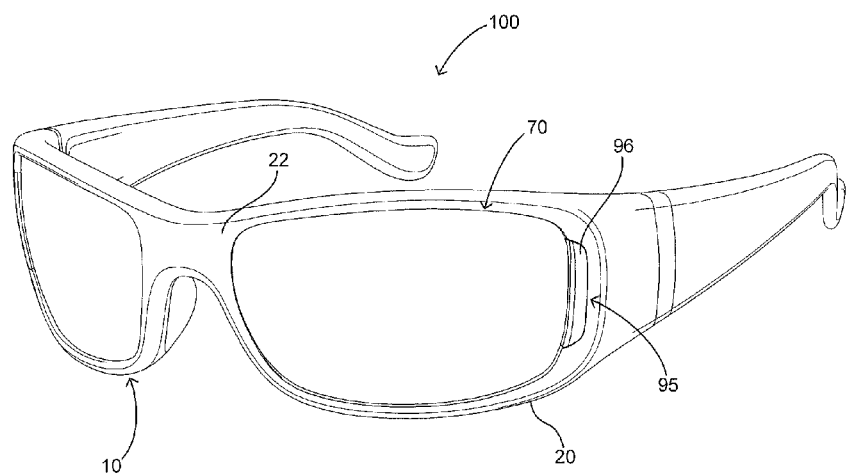
FIG. 6 is a perspective view of eyeglasses in accordance with an embodiment of the present technology.

FIG. 6 also shows an example of eyewear in accordance with the present technology. As shown, the two individualized lenses 70 may be separately inserted into the frame 10 to form eyewear 100. To insert each lens of the lenses 70, the bridge end of the lenses 70 may be inserted into the groove 30 such that the second coupling element 90 attaches to the second mating element 60. When, as in the example of FIGS. 1-6, the second mating element 60 and the second coupling element 90 are both magnets, each of these elements will have two portions having opposite magnetic polarities. One portion of the second mating element 60 may include the exposed face 62 which has one of a north and south polarity and one portion of the second coupling element 90 may include the contact face 92 which has the other of the north and south polarity. In this manner, the second mating element may be inserted within the groove 30 and the second coupling element 90 may be inserted into the lens body 72 such that the exposed face 62 of the second mating 60 is attracted to the contact face 92 of the second coupling element 90. In this manner, the lens 70 has both (i) a structural mechanical stop provided by a groove as well as (ii) a magnetic mechanical stop provided by the attraction of the mating and coupling elements in a direction away from the front of the eyewear 100.

Once the bridge end of the lens 70 is inserted into the groove 30, a substantial portion of the lens body 72 may be placed onto the ledge 24 of the rim 20 and the temple end of the lens 70 may be inserted into the indentation 27. When the lens 70 is inserted into the indentation 27, the exposed face 42 of the first mating element 40 may be attracted to the contact face 82 of the first coupling element 80 in the same manner as in the interface of the contact face 92 with the second coupling element 90.

Additionally, during insertion of the lens 70, the portions of the coupling elements 80, 90 opposite the portions having the respective contact faces 82, 92 also may repel from the portions of the respective mating elements 40, 60 opposite the exposed faces 42, 62 such that the contact faces 82, 92 are guided to the exposed faces 42, 62 where the coupling elements 80, 90 become attached to the corresponding mating elements 40, 60 when the lens 70 is inserted into the inner portion 25 of the rim 20 in a proper seated position with the bridge end of the lens 70 inserted into the groove 30 and the temple end of the lens 70 inserted into the indentation 27. Such guiding occurs because the repelling forces between the portions of the coupling elements 80, 90 opposite the contact faces 82, 92 and the portions of the respective mating elements 40, 60 opposite the exposed faces 42, 62 prevent contact between these portions, creating a floating or hovering effect until the attracting portions of the respective coupling elements and mating elements become near enough that the attractive forces between them overcome the repelling forces between the repelling portions.

Optionally, as shown in FIG. 6, upon insertion of the lenses 70 into the frame 10, the engagement and configuration of the lenses 70 and the frame 10 may be such that substantially no portion of the coupling elements nor the mating elements are visible. Accordingly, in some arrangements, the groove 30 may provide a partial viewing barrier to the second mating element 60 and the second coupling element 90. Furthermore, as shown in FIG. 6, in some arrangements, the tab 95 may provide a cover over the first mating element 40 and the first coupling element 80.

Referring to FIGS. 2, 5, and 6, the depth of the lip surface 36 of the indentation 27 may be predetermined such that the exposed surface 96 of the tab 95 may be flush with the front face 22 of the rim 20 when the temple end of the rear face 74 of the lens 70 is properly placed on the lip surface 36 and the temple end of the lens 70 is properly inserted into the indentation 27. Moreover, an edge of the tab 95 on the temple side of the lens 70 may be dimensioned to substantially conform to the sidewall 28 of the indentation 27. Thus, the tab 95 may complete an ornamental design of the frame that is missing as a result of the indentation 27 of the frame 10. In this manner, the eyewear 100 may have an appearance of conventional eyewear that does not permit interchangeability of lenses. As further shown in FIG. 6, there may be a slight gap between the sidewall 28 of the indentation 27 and the tab 95 when the lens 70 is inserted into the frame 10.

Although in the example shown in the figures herein, the rim is a full rim, in other embodiments of the present technology, the rims may not be full rims that completely surround the annulus. In other alternative embodiments, the ledge on the inner portion of the rim may be placed closer to the distal portion of the rim in which instance the lenses may be inserted through the rear face of the frame. It should be noted, however, that placement of the lenses through the rear face may introduce safety hazards since a force applied to lenses inserted into frames having such a configuration may potentially become detached from the frame and not have any mechanical stop to prevent the lenses from contacting and potentially injuring the user.

In further alternative embodiments, the mating elements and coupling elements may have different shapes including, but not limited to, rectangular prism shapes and shapes having concave or convex surfaces including curved and spherical surfaces. In still further alternative embodiments, one of either of the corresponding mating elements and coupling elements may be composed of magnetic materials while the other of the corresponding elements is a magnet such that the corresponding elements attach to one another. However, such a configuration would not produce repelling forces to be used for guiding the insertion of the lenses into the frames.

In other embodiments, lenses may not have a tab that covers a coupling element attached to the lens but instead have a coupling element that is coated with a color to substantially match the color of the frame. For instance, the coupling element may be a magnet that is anodized black. In still other embodiments, either or both of the mating and coupling elements may be fasteners such as screws used to engage the other element. In still further alternative embodiments, the lens and the tab may form a monolithic structure such that they are not separable.

It is to be understood that the disclosure set forth herein includes all possible combinations of the particular features set forth herein. For example, where a particular feature is disclosed in the context of a particular aspect, arrangement, configuration, or embodiment, or a particular claim, that feature can also be used, to the extent possible, in combination with and/or in the context of other particular aspects, arrangements, configurations, and embodiments of the technology, and in the technology generally.

Furthermore, although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A frame for a pair of individualized eyeglass lenses, the frame having two temples for resting the frame on a user's ears, a bridge for resting the frame on a user's nose, and a rim located between the bridge and each of the two temples for receiving first and second lenses of the pair of eyeglass lenses therein, at least one of the rims comprising:
 a front face;
 an inner portion circumscribing the rim having (i) a first portion at least partially adjacent to the bridge, the first portion having a ledge for supporting a bridge side of the first lens and (ii) a second portion adjacent to the temple having an indentation and a lip on a bottom thereof for supporting a temple side opposite the bridge side of the first lens, wherein the indentation is dimensioned such that when the first lens is received in the rim, a lens tab applied to and extending from the first lens may be inserted into the indentation to fill a portion thereof; and
 at least one mating element exposed within the second portion for detachably attaching to at least one coupling element of the first lens attached to the lens under the lens tab.

2. The frame of claim 1, wherein the second portion of the inner portion includes a groove adjacent to the bridge, such that when a lens is received in the rim, a portion of the lens is inserted into the groove.

3. The frame of claim 2, wherein there are two mating elements adapted for bonding to two coupling elements of the first lens, one of the mating elements being along the second portion and the other of the mating elements being in the groove.

4. The frame of claim 1, the at least one coupling element of the first lens being a magnet, wherein the at least one mating element of the frame is a corresponding magnet for bonding to the magnet of the first lens.

5. The frame of claim 1, wherein each of the rims is a full rim.

6. The frame of claim 1, the lip being set at a depth from the front face such that when the first lens is received in the rim, a top surface of the tab is flush with the front face.

7. A lens assembly for eyeglasses comprising:
 a lens having a body with front and rear surfaces and perimeter thereabout, the lens being adapted for insertion into a frame having a front face and at least one mating element attached within an indentation formed on an inner portion of a rim thereof, the inner portion circumscribing the rim;
 a tab applied to and extending from the front surface of the lens at the perimeter, the tab being dimensioned such that upon insertion of the lens into the frame, the tab fills a portion of the indentation of the frame rim, the tab comprising an ornamental portion corresponding to a missing ornamental portion of the frame; and
 a first coupling element attached along a first portion of the perimeter of the lens and behind the tab, the first coupling element for detachably attaching to a first mating element attached to the rim.

8. The lens assembly of claim 7, a portion of the rear surface of the lens being directly below the tab, wherein the portion of the rear surface directly below the tab is adapted to rest on a lip along the inner portion of the rim.

9. The lens assembly of claim 8, the lip of the inner portion of the rim being on a temple side of a frame such that the tab is positioned on the temple side of the frame when the lens is inserted into the frame.

10. The lens assembly of claim 7, wherein the tab is further dimensioned such that upon insertion of the lens into the frame, the tab is flush with the front face.

11. The lens assembly of claim 7, wherein the tab forms a monolithic structure with the lens such that the tab and the lens are not separable.

12. The lens assembly of claim 7, further comprising a second coupling element attached along a second portion of the perimeter of the lens, the second coupling element for detachably attaching to a second mating element, the indentation being on a temple side of the rim and the second mating element being attached to a groove in the inner portion on a bridge side of the rim opposite the temple side,
 wherein each of the first and second coupling elements are magnets and each of the first and second mating elements are magnetic, and
 wherein the first and second coupling elements are attracted to the first and second mating elements, respectively.

13. Modular eyewear comprising:
 a frame having two temples for resting the frame on a user's ears, a bridge for resting the frame on a user's nose, and a rim located between the bridge and each of the two temples, each of the rims including a front face, an inner portion circumscribing the rim having a groove adjacent to the bridge, the groove having a first frame magnet attached along a portion thereof, and an indentation adjacent the corresponding temple, the indentation having a second frame magnet attached along a portion thereof; and
 removable lens assemblies insertable into each of the rims of the frame, each of the lens assemblies including a lens having a body with front and rear surfaces and a perimeter thereabout, a tab applied to and extending from the lens, a first magnetic coupling attached along a first portion of the perimeter, and a second magnetic coupling attached along a second portion of the perimeter,
 wherein, when the lens assemblies are inserted into the frame, the first frame magnet magnetically attaches to the first magnetic coupling and the second frame magnet magnetically attaches to the second magnetic coupling, and
 wherein the indentation of each of the rims of the frame further has a lip on a bottom thereof for supporting a temple side opposite a bridge side of each of the lens assemblies, wherein the lip is set at a depth from the front face such that a top surface of the tab of the lens assemblies is flush with the front face upon insertion of the lens assemblies into the frame.

14. The modular eyewear of claim 13, wherein the rim is a full rim.

* * * * *